United States Patent
Schack et al.

(10) Patent No.: US 10,943,130 B2
(45) Date of Patent: Mar. 9, 2021

(54) METHOD, DEVICE AND COMPUTER READABLE STORAGE MEDIUM WITH INSTRUCTIONS FOR DETERMINING THE LATERAL POSITION OF A TRANSPORTATION VEHICLE RELATIVE TO THE LANES OF A CARRIAGEWAY

(71) Applicant: VOLKSWAGEN AKTIENGESELLSCHAFT, Wolfsburg (DE)

(72) Inventors: Moritz Schack, Braunschweig (DE); Markus Kerper, Braunschweig (DE)

(73) Assignee: Volkswagen Aktiengesellschaft

( * ) Notice: Subject to any disclaimer, the term of this patent is extended or adjusted under 35 U.S.C. 154(b) by 17 days.

(21) Appl. No.: 16/304,319

(22) PCT Filed: Apr. 27, 2017

(86) PCT No.: PCT/EP2017/060130
§ 371 (c)(1),
(2) Date: Nov. 26, 2018

(87) PCT Pub. No.: WO2017/202570
PCT Pub. Date: Nov. 30, 2017

(65) Prior Publication Data
US 2019/0138824 A1 May 9, 2019

(30) Foreign Application Priority Data
May 27, 2016 (DE) .................... 10 2016 209 232.4

(51) Int. Cl.
*G06K 9/00* (2006.01)
*G08G 1/16* (2006.01)
(Continued)

(52) U.S. Cl.
CPC ......... *G06K 9/00798* (2013.01); *B60W 30/12* (2013.01); *G01C 21/30* (2013.01);
(Continued)

(58) Field of Classification Search
CPC ... B60W 30/12; G01C 21/30; G01C 21/3658; G06F 16/29; G06K 9/00798;
(Continued)

(56) References Cited

U.S. PATENT DOCUMENTS 6,023,653 A * 2/2000 Ichimura ................. G01C 21/30
701/446
2003/0187578 A1 * 10/2003 Nishira ..................... G08G 1/167
701/301
(Continued)

FOREIGN PATENT DOCUMENTS

DE 102009060600 A1 6/2011
DE 102012104786 A1 12/2012
(Continued)

OTHER PUBLICATIONS

Topfer et al. "Efficient Scene Understanding for Intelligent Vehicles Using a Part-Based Road Representation" 2013 IEEE Intelligent Transportation Systems (ITSC 2013) (Year: 2013).*
(Continued)

*Primary Examiner* — Ian L Lemieux
(74) *Attorney, Agent, or Firm* — Barnes & Thornburg LLP

(57) ABSTRACT

A method, a device and a computer-readable storage medium with instructions for determining the lateral position of a transportation vehicle relative to the lanes of a carriageway. An image processing unit acquires geometry information and property information relating to carriageway markings. A position-determining unit determines an approximate position of the transportation vehicle. An
(Continued)

evaluation unit determines the lateral position of the transportation vehicle by comparing the determined geometry information and property information of the carriageway markings with carriageway marking geometries at the approximate position determined for the transportation vehicle, from a lane geometry map. The lane geometry map contains lane center geometries and lane edge geometries with a high level of accuracy with respect to one another.

8 Claims, 2 Drawing Sheets

(51) Int. Cl.
    *G01C 21/30*     (2006.01)
    *G01C 21/36*     (2006.01)
    *G06T 7/62*     (2017.01)
    *G06T 7/70*     (2017.01)
    *G06F 16/29*     (2019.01)
    *B60W 30/12*     (2020.01)

(52) U.S. Cl.
    CPC ......... *G01C 21/3658* (2013.01); *G06F 16/29* (2019.01); *G06T 7/62* (2017.01); *G06T 7/70* (2017.01); *G08G 1/167* (2013.01); *G06T 2207/30256* (2013.01)

(58) Field of Classification Search
    CPC ... G06T 2207/30256; G06T 7/62; G06T 7/70; G08G 1/167
    See application file for complete search history.

(56) References Cited

U.S. PATENT DOCUMENTS

| | | | | |
|---|---|---|---|---|
| 2010/0014712 A1* | 1/2010 | Sampedro Diaz | ..... | G01C 21/32 382/104 |
| 2012/0238218 A1* | 9/2012 | Stine | ..... | H04W 16/00 455/67.11 |
| 2013/0346423 A1* | 12/2013 | MacGougan | ..... | G01S 19/52 707/748 |
| 2014/0358321 A1 | 12/2014 | Ibrahim | | |
| 2017/0358204 A1* | 12/2017 | Modica | ..... | G07C 5/0841 |
| 2018/0202814 A1* | 7/2018 | Kudrynski | ..... | G01S 17/89 |
| 2018/0304891 A1* | 10/2018 | Heidenreich | ..... | G05D 1/021 |
| 2019/0226853 A1* | 7/2019 | Kubiak | ..... | G06T 3/0043 |
| 2019/0265050 A1* | 8/2019 | Fujimoto | ..... | G09B 29/10 |

FOREIGN PATENT DOCUMENTS

| | | |
|---|---|---|
| DE | 102014008849 A1 | 11/2014 |
| DE | 102014211450 A1 | 12/2014 |
| EP | 2012211 A1 | 1/2009 |
| EP | 2899669 A1 | 7/2015 |
| WO | WO-2013133752 A1 * 9/2013 ........... B62D 15/025 |

OTHER PUBLICATIONS

Whuber, 'Re: Measuring accuracy of latitude and longitude?'. In Stack Exchange [online] Answered Apr. 18, 2011 at 16:17; [retrieved on Oct. 30, 2020]. Retrieved from the Internet: https://gis.stackexchange.com/questions/8650/measuring-accuracy-of-latitude-and-longitude/8674#8674 (Year: 2011).*

Wu et al.; Vehicle localization using road markings; 2013 IEEE Intelligent Vehicles Symposium (IV); Jun. 23, 2013; pp. 1185-1190.

Search Report for German Patent Application No. 10 2016 209 232.4; dated Jan. 30, 2017.

Search Report for International Patent Application No. PCT/EP2017/060130; dated Aug. 2, 2017.

* cited by examiner

METHOD, DEVICE AND COMPUTER READABLE STORAGE MEDIUM WITH INSTRUCTIONS FOR DETERMINING THE LATERAL POSITION OF A TRANSPORTATION VEHICLE RELATIVE TO THE LANES OF A CARRIAGEWAY

PRIORITY CLAIM

This patent application is a U.S. National Phase of International Patent Application No. PCT/EP2017/060130, filed 27 Apr. 2017, which claims priority to German Patent Application No. 10 2016 209 232.4, filed 27 May 2016, the disclosures of which are incorporated herein by reference in their entireties.

SUMMARY

Illustrative embodiments relate to a method, a device, and a computer-readable storage medium comprising instructions for determining the lateral position of a transportation vehicle relative to the lanes of a roadway, and, in particular, for determining a relative lateral position with sub-lane accuracy. Illustrative embodiments further relate to a transportation vehicle comprising such a device, and a lane geometry map comprising lane center geometries and lane edge geometries for use with such a method or such a device.

BRIEF DESCRIPTION OF THE DRAWINGS

Disclosed embodiments will be apparent from the following description and the appended claims, in connection with the figures, in which:

DETAILED DESCRIPTION

Figure 1:
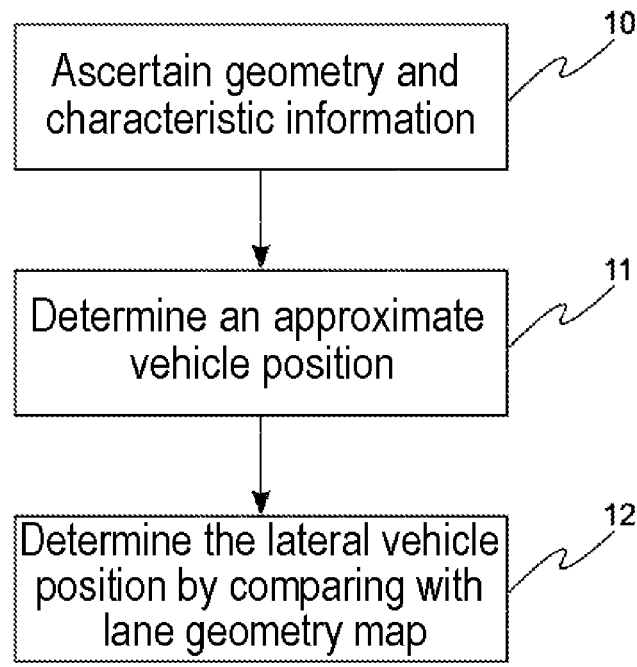
FIG. 1 shows a schematic depiction of a method for determining a lateral position of a transportation vehicle relative to the lane of a roadway.

Modern transportation vehicles are becoming increasingly more autonomous, i.e., the transportation vehicles provide more and more functions and systems to the driver, which support the driver via messages in controlling the transportation vehicle, or which assume portions of the transportation vehicle control. For such functions and systems, a variety of information is required about the transportation vehicle and its surroundings.

For the "navigation with lane-level precision" function, for example, knowledge is required about the lanes in which the transportation vehicle to be navigated, the "host transportation vehicle", is located. This lane is also referred to as the "host lane". Furthermore, for automatic driving and car-to-car-based applications, in addition to knowledge about the host lane, more precise information is also required with respect to the lateral offset of the host transportation vehicle relative to the host lane. It must be known at all times, with sub-lane precision, where the host transportation vehicle is located laterally with respect to the roadway.

The publication US 2014/0358321 A1 discloses a method for detecting and tracking the boundaries of a traffic lane. The method uses maps comprising information about the road geometry, GPS data, course data, and the positions of other transportation vehicles, for determining the instantaneous position.

The publication EP 2 899 669 A1 describes a method for determining the lateral position of a transportation vehicle relative to the lane of a road. With the aid of a camera, geometric facets of the lane are ascertained, for example, roadway markings. The ascertained facets are classified and are used for position determination. The classification requires training the classification unit.

The publication DE 10 2012 104 786 A1 describes a system for accurately evaluating a lane in which a transportation vehicle is traveling. A system for lane ascertainment provides estimated lanes which are determined in various ways. Examples include lane markings detected by a camera, a lead transportation vehicle, or GPS/maps which are accurate to the lane level. The estimated lanes are provided with confidence information. The estimated lanes and the corresponding confidence information are merged to obtain an ascertained lane.

To summarize, essentially three approaches are currently followed for determining the lateral position of a transportation vehicle relative to a roadway.

A first approach consists of using a highly accurately calibrated digital lane geometry map having absolute accuracy in the centimeter range, in connection with a highly accurate two-frequency GPS system. Here, the position on the map is determined with the aid of the GPS sensor, without additional imaging sensor systems. However, due to GPS and map inaccuracies with respect to the absolute position, it is often impossible to associate the host transportation vehicle with the correct lane. In addition, an approach using a highly accurate map and a highly accurate GPS is very expensive.

Another approach consists of using imaging sensors, for example, of a camera system. It is thereby possible to associate the host transportation vehicle with lanes relative to lanes ascertained by the sensor system. However, the use of imaging sensors without the simultaneous use of a digital map frequently results in only one or two lanes being detected by the sensor system. The positioning of the host transportation vehicle can then only take place relative to the known lanes, but not relative to all lanes.

A third approach combines imaging sensor systems with map information relating to the number of lanes and their marking types. By using imaging sensors and the information from a digital map about how many lanes are available and what kinds of edge markings they use (dashed, solid, . . . ), the host transportation vehicle can be associated with all lanes. However, due to spacing errors in the lane markings detected by the sensors relative to the host transportation vehicle, the accuracy of the lateral offset with respect to the corresponding lane is not sufficient for the aforementioned applications.

Disclosed embodiments provide a method and a device for determining a lateral position of a transportation vehicle relative to the lanes of a roadway, which enable a determination of the relative lateral position with sub-lane accuracy.

This is achieved via a method, via a device, and via a computer-readable storage medium comprising instructions.

According to a first disclosed embodiment, a method for determining a lateral position of a transportation vehicle relative to the lane of a roadway comprises the operations of:

Ascertaining geometry information and characteristic information about roadway markings;

Determining an approximate position of the transportation vehicle; and

Determining the lateral position of the transportation vehicle by comparing the ascertained geometry information and characteristic information about the roadway markings with roadway marking geometries at the approximate position determined for the transportation vehicle from a lane geometry map which contains lane center geometries and lane edge geometries having a high degree of accuracy with respect to one another.

According to another disclosed embodiment, a device for determining a lateral position of a transportation vehicle relative to the lane of a roadway comprises:

An image processing unit for ascertaining geometry information and characteristic information about roadway markings;

A position determination unit for determining an approximate position of the transportation vehicle; and An evaluation unit for determining the lateral position of the transportation vehicle by comparing the ascertained geometry information and characteristic information about the roadway markings with roadway marking geometries at the approximate position determined for the transportation vehicle from a lane geometry map which contains lane center geometries and lane edge geometries having a high degree of accuracy with respect to one another.

According to another disclosed embodiment, a computer-readable storage medium contains instructions which, when executed by a computer, cause the computer to execute the following operations:

Ascertaining geometry information and characteristic information about roadway markings;

Determining an approximate position of the transportation vehicle; and

Determining the lateral position of the transportation vehicle by comparing the ascertained geometry information and characteristic information about the roadway markings with roadway marking geometries at the approximate position determined for the transportation vehicle from a lane geometry map which contains lane center geometries and lane edge geometries having a high degree of accuracy with respect to one another.

The disclosed method having sub-lane accuracy, for determining the lateral transportation vehicle position relative to the roadway, is based on the comparison of roadway markings, which were detected via an imaging sensor system, with roadway marking geometries from a digital lane geometry map. The map is subject to no particular requirements with respect to absolute accuracy, but contains the lane center geometries and lane edge geometries having a high degree of accuracy with respect to one other. The method is based on a modular concept. Sensor data may be easily added or omitted as a function of the available input data and/or the quality of the input data.

According to at least one disclosed embodiment, a number of possible lateral positions of the transportation vehicle are determined. A best-possible lateral positions of the transportation vehicle is then ascertained by using at least one evaluation function. By using evaluation functions, it is possible to adapt to different sensor systems, maps, and transportation vehicles in a simple manner.

According to at least one disclosed embodiment, a history of past lateral positions determined for the transportation vehicle is taken into account during the determination of an instantaneous lateral position of the transportation vehicle.

By using the history, past positions are factored in and have a stabilizing effect on the determination of the instantaneous position.

According to at least one disclosed embodiment, in the case that no lateral position of the transportation vehicle can be determined by the comparison of the ascertained geometry information and characteristic information about the roadway markings with roadway marking geometries, an approximately lateral position is generated. In this way, position information is also provided if no usable roadway markings were detected or if no possible transportation vehicle positions were ascertained.

Optionally, a disclosed method or a disclosed device is used in an autonomously or manually controlled transportation vehicle, in particular, a motorized transportation vehicle.

To improve the understanding of the principles of the disclosure, exemplary embodiments will be described below in greater detail, based on the figures. It is to be understood that the present disclosure is not limited to these embodiments, and that the described features may also be combined or modified without departing from the scope of protection of the disclosure as it is defined in the appended claims.

FIG. 1 shows a schematic depiction of a method for determining a lateral position of a transportation vehicle relative to the lane of a roadway. In a first operation, geometry information and characteristic information about roadway markings are ascertained 10. Furthermore, an approximate position of the transportation vehicle is determined 11. By comparing the ascertained geometry information and characteristic information about the roadway markings with roadway marking geometries at the approximate position determined for the transportation vehicle from a lane geometry map, the lateral position of the transportation vehicle is finally determined 12. For this purpose, the lane geometry map contains lane center geometries and lane edge geometries having a high degree of accuracy with respect to one other.

Optionally, a number of possible lateral positions of the transportation vehicle is determined 12, wherein a best-possible lateral positions of the transportation vehicle is then ascertained by using at least one evaluation function. In this case, for example, a history of past lateral positions determined for the transportation vehicle may be taken into account. In the case that no lateral position of the transportation vehicle can be determined as a result of the comparison of the ascertained geometry information and characteristic information about the roadway markings with roadway marking geometries, an approximately lateral position may be generated.

Figure 2:
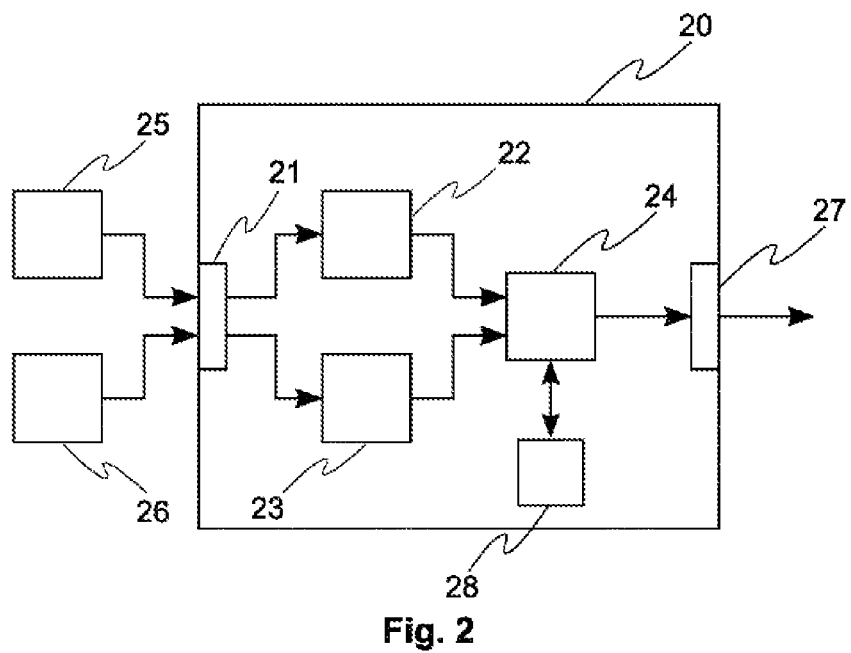
FIG. 2 shows a first exemplary embodiment of a device for determining a lateral position of a transportation vehicle relative to the lane of a roadway.

FIG. 2 shows a simplified depiction of a first disclosed embodiment of a device 20 for determining a lateral position of a transportation vehicle relative to the lane of a roadway. The device 20 has an image processing unit 22 for ascertaining 10 geometry information and characteristic information about roadway markings. For this purpose, the image processing unit 22 uses, for example, image information of a camera unit 25 which is received via an input 21 of the device 20. Furthermore, the device 20 has a position determination unit 23 for determining 11 an approximate position of the transportation vehicle. The approximate position of the transportation vehicle is determined, for example, based on reception data of a GPS receiver 26, which may also be received via the input 21. An evaluation unit 24 determines 12 the lateral position of the transportation vehicle by comparing the ascertained geometry information and characteristic information about the roadway markings with roadway marking geometries at the approximate position determined for the transportation vehicle from a lane geometry map. For this purpose, the lane geometry map contains lane center geometries and lane edge geometries having a high degree of accuracy with respect to one other.

Optionally, the evaluation unit 24 determines 12 a number of possible lateral positions of the transportation vehicle. A best-possible lateral positions of the transportation vehicle is then ascertained by using at least one evaluation function. In this case, in particular, a history of past lateral positions determined for the transportation vehicle may be taken into account during the determination of an instantaneous lateral position of the transportation vehicle. In the case that no lateral position of the transportation vehicle can be determined by the comparison of the ascertained geometry information and characteristic information about the roadway markings with roadway marking geometries, the evaluation unit 24 may generate an approximately lateral position.

The lateral position of the transportation vehicle which is determined by the evaluation unit 24 may be made available for further processing, for example, for processing in a lane guidance system, via an output 27 of the device 20. In addition, the position may be stored in a memory 28 of the device 20, for example, for later evaluation. The input 21 and the output 27 may be implemented as separate interfaces or as a combined bidirectional interface. The image processing unit 22, the position determination unit 23, and the evaluation unit 24 may be implemented as dedicated hardware, for example, as integrated circuits. Of course, they could also be partially or completely combined or implemented as software which runs on a suitable processor.

Figure 3:
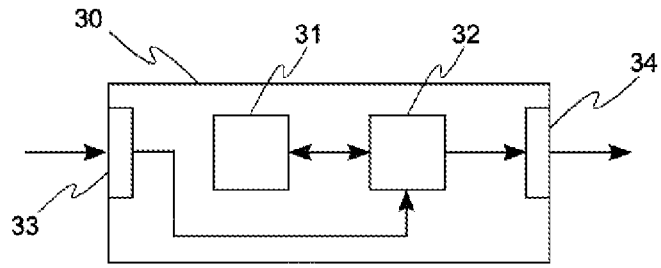
FIG. 3 shows a second exemplary embodiment of a device for determining a lateral position of a transportation vehicle relative to the lane of a roadway.

FIG. 3 shows a simplified schematic representation of a second disclosed embodiment of a device 30 for determining a lateral position of a transportation vehicle relative to the lane of a roadway. The device 30 comprises a processor 32 and a memory 31. For example, the device 30 is a computer or a workstation. Instructions are stored in the memory 31 which cause the device 30 to execute the operations according to one of the described methods during execution by the processor 32. The instructions stored in the memory 31 thus incorporate a program which is executable by the processor 32, and which implements the disclosed method. The device has an input 33 for receiving the information. Data generated by the processor 32 are provided via an output 34. In addition, the data could be stored in the memory 31. The input 33 and the output 34 may be combined into a bidirectional interface.

The processor 32 may comprise one or multiple processor units, for example, microprocessors, digital signal processors, or combinations thereof.

The memories 28, 31 of the described embodiments may comprise volatile and/or non-volatile memory ranges and a variety of memory devices and storage media, for example, hard disks, optical storage media, or semiconductor memories.

An embodiment is to be described below in detail. The method is based on a series of input data. The geometry and characteristic information about the visible roadway markings which are ascertained by the imaging sensor system are required initially. They are referred to below as IP (image processing) lines. Absolute position information comprising direction and speed specifications is also required. The information may, for example, be provided by the transportation vehicle GPS. For the absolute position information, in the present disclosed embodiment, a differentiation is provided between absolute position information, which represents the direct result of a localization via a GNSS (global navigation satellite system) (GNSS position data), and information which was interpolated based on a past GNSS localization via dead reckoning (absolute position data). Optionally, relative, jump-free position information may be used, which, for example, is ascertained by motion estimation.

In addition, map data are used which have a relatively high degree of accuracy with respect to lanes and roadway markings. The data are, for example, provided via a map data server 110. The map information is depicted below as DLM (detailed lane model) lanes and DLM lane markings. Optionally, results from the preceding sequence or preceding sequences of the method are included as history, except, of course, in the first iteration.

Figure 4:
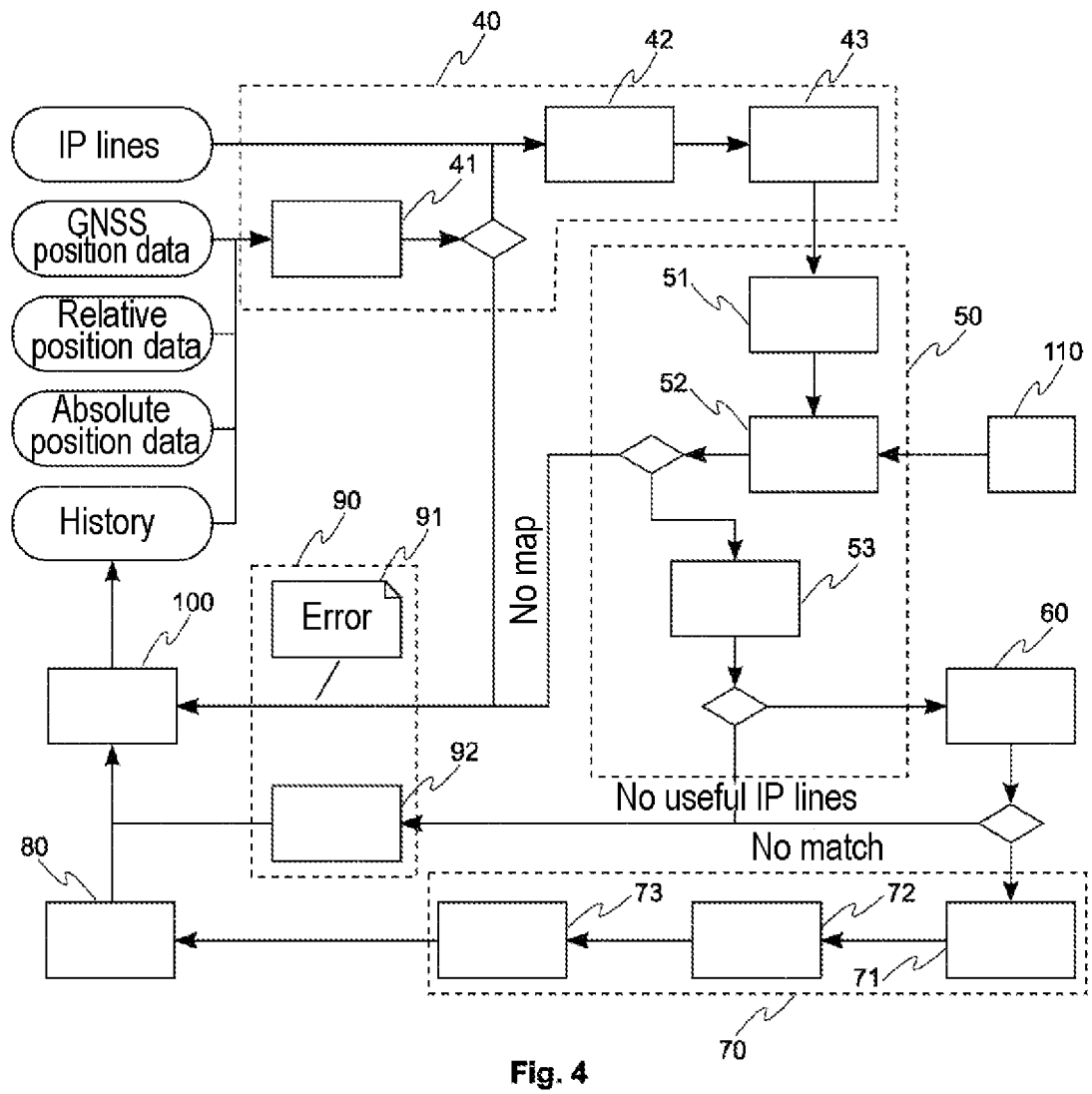
FIG. 4 shows a disclosed embodiment of the method depicted in FIG. 1.

The basic sequence of the method is divided into multiple parts, which are partially summarized in FIG. 4 in blocks depicted by dashed lines.

Within the scope of preparation 40 of the input data, an approximate transportation vehicle position is determined 41. The position is used as the starting point for the comparison of roadway markings with map data. In addition, a recalculation and aggregation of the geometries of the IP lines takes place.

The geometries of the roadway markings detected by the camera system are typically described via clothoids in a transportation vehicle-relative Cartesian coordinate system. The clothoid descriptions are transformed into polylines, which emulate the clothoid geometries in good approximation. The conversion into polylines is carried out given that the algorithms subsequently operating on the roadway marking geometries are thus considerably simpler to implement. In the present embodiment, the coordinates of the polylines are transformed 42 from the transportation vehicle-relative Cartesian coordinate system into the WGS84 coordinate system. The subsequent algorithms operate in the WGS84 coordinate system, given that the map data and the transportation vehicle position and movement information are typically also available in this coordinate system.

The geometries of the roadway markings detected by the camera system always begin just in front of the transportation vehicle and have an extension of several meters approximately in the driving direction/camera view direction. Occasionally, roadway markings are initially correctly detected and transmitted via the camera system, but are no longer detected shortly thereafter. The IP lines which are available in an algorithm iteration are therefore always buffered, and during the next iteration, are compared 43 to the geometries which are newly transmitted by the camera system.

Subsequently, essential geometry facets are extracted 50. Here, points of IP lines and DLM lane markings for the longitudinal transportation vehicle position are calculated. For this purpose, initially, an orthogonal line of a configurable length is devised 51 at a configurable distance from the approximate transportation vehicle position. Subsequently, intersections of the DLM lane markings and the DLM lanes with the orthogonal path are ascertained 52. The lateral position relative to the transportation vehicle, for example, as the distance from the center point of the orthogonal path, and in the case of DLM lane markings, the information about the type of the associated roadway marking (line dashed/solid, guard rail, shoulder, . . . ), may be determined for each intersection. In an additional operation, the intersections of the orthogonal path with the IP lines are formed 53. In turn, the lateral position relative to the transportation vehicle and the information about the type of detected roadway marking (line dashed/solid, guard rail, shoulder, . . . ) may be determined for each intersection.

Based on the results of the preceding operation, a number of possible transportation vehicle positions are ascertained 60. The positions are subsequently evaluated 70 via a sequence of corresponding evaluation functions, wherein the possible transportation vehicle positions are possibly supplemented or modified. Penalty points are assigned with the aid of the evaluation functions. The first evaluation function 71 considers the association of the line types detected by the camera with the line types stored in the map. For this evaluation, a configurable matrix may be provided which assigns a specific value for each combination of IP line and map roadway marking type. Thus, frequently occurring incorrect assignments by the camera, for example, the detection of a solid line as a dashed line, may be associated with a slightly low score; unlikely associations by the camera, for example, the detection of a shoulder as a guard rail, may be associated with a very low score. A second evaluation function 72 considers the history of the transportation vehicle positions. Possible transportation vehicle positions which deviate strongly from the history are characterized, for example, by high penalty points. In the present disclosed embodiment, a third evaluation function 73 evaluates the lane type. The transportation vehicle is assumed to be in a normal lane of the roadway. Possible transportation vehicle positions in lanes which are not provided for travel (shoulders, "unknown lanes" of the DLM, and emergency lanes, . . . ) are therefore scored low; possible transportation vehicle positions in navigable lanes are scored neutrally. As an additional example, significantly higher penalty points are assigned for possible transportation vehicle positions on the opposite side of the roadway than for positions in the direction of travel. The allocation of the penalty points is a function of the sensor system which is used and the digital map which is used.

Thus, a specific adjustment may be very easily made for the systems which are used. Finally, the possible transportation vehicle position receiving the highest score is selected 80 as a result of the evaluation method.

During the execution of the method, at various positions, it may occur that due to the lack of input data or an insufficient quality of the input data, a position determination is not possible, and the execution cannot be continued. For such cases, it is possible to exit the modular execution at the corresponding position and to initiate error handling 90, for example, to generate a result without position information, or including position information which is approximately determined in another manner. In FIG. 4, the paths of the normal execution are indicated by solid arrows; the paths in the case of deviation from the normal execution are indicated by dashed arrows.

For example, in the case of non-availability of map data for the instantaneous transportation vehicle position according absolute position information, no ascertainment of the possible transportation vehicle positions is carried out. In the absence of absolute position information (for example, no GNSS reception due to construction), if relative position information is available, the absolute position information may be replaced by earlier absolute position information and relative position information. If no relative position information is available, in the case of the absence of absolute position information, no ascertainment of the possible transportation vehicle positions is carried out. In such cases, a corresponding error status is issued 91. On the other hand, if too few IP lines were detected, if no sufficiently good association of DLM lane markings with IP lines can be found, or if no possible transportation vehicle positions were ascertained, approximately determined position information may be ascertained with the aid of a map-based method 92. For example, one possibility is to assume a continuation of the transportation vehicle movement along the center of the lane according to the map. In a concluding operation at 100, the results are prepared, made available for additional processing, and transferred to the history.

The invention claimed is:

1. A method, implemented in a non-transitory computer readable storage medium, for determining a lateral position of a transportation vehicle relative to the lane of a roadway, the method comprising:

ascertaining geometry information and characteristic information about roadway markings;

determining an approximate position of the transportation vehicle; and determining the lateral position of the transportation vehicle by comparing the ascertained geometry information and characteristic information about the roadway markings with roadway marking geometries at the approximate position determined for the transportation vehicle from a lane geometry map, wherein the lane geometry map contains lane center geometries and lane edge geometries having sub-lane accuracy with respect to one another; the lane geometry map being stored in a non-transitory computer readable storage medium, and comprising matrices containing a plurality of sets of WGS84 coordinates, and where, in response to a failure to determine the lateral position of the transportation vehicle by comparison of the ascertained geometry information and characteristic information about the roadway markings with roadway marking geometries, an approximate lateral position is generated.

2. The method of claim 1, wherein a number of possible lateral positions of the transportation vehicle are determined, and a best-possible lateral positions of the transportation vehicle is ascertained by using at least one evaluation function.

3. The method of claim 1, wherein a history of past lateral positions determined for the transportation vehicle is taken into account during the determination of an instantaneous lateral position of the transportation vehicle.

4. A device for determining a lateral position of a transportation vehicle relative to the lane of a roadway, the device comprising:

an image processing unit for ascertaining geometry information and characteristic information about roadway markings;

a position determination unit for determining an approximate position of the transportation vehicle; and an evaluation unit for determining the lateral position of the transportation vehicle by comparing the ascertained geometry information and characteristic information about the roadway markings with roadway marking geometries at the approximate position determined for the transportation vehicle from a lane geometry map, wherein the lane geometry map contains lane center geometries and lane edge geometries having sub-lane accuracy with respect to one another; the lane geometry map being stored in a non-transitory computer readable storage medium, and comprising matrices containing a plurality of sets of WGS84 coordinates, and where, in response to a failure by the evaluation unit to determine the lateral position of the transportation vehicle by comparison of the ascertained geometry information and characteristic information about the roadway markings with roadway marking geometries, an approximate lateral position is generated.

5. The device of claim 4, wherein the evaluation unit determines a number of possible lateral positions of the transportation vehicle, and ascertains a best-possible lateral positions of the transportation vehicle by using at least one evaluation function.

6. The device of claim 4, wherein the evaluation unit takes into account a history of past lateral positions determined for the transportation vehicle when determining an instantaneous lateral position of the transportation vehicle.

7. A non-transitory computer-readable storage medium comprising instructions which, when executed by a computer, cause the computer to execute the following operations:
   ascertaining geometry information and characteristic information about roadway markings;
   determining an approximate position of the transportation vehicle; and
   determining the lateral position of the transportation vehicle by comparing the ascertained geometry information and characteristic information about the roadway markings with roadway marking geometries at the approximate position determined for the transportation vehicle from a lane geometry map,
   wherein the lane geometry map contains lane center geometries and lane edge geometries having sub-lane accuracy with respect to one another; the lane geometry map being stored in a non-transitory computer readable storage medium, and comprising matrices containing a plurality of sets of WGS84 coordinates, and
   where, in response to a failure to determine the lateral position of the transportation vehicle by comparison of the ascertained geometry information and characteristic information about the roadway markings with roadway marking geometries, an approximate lateral position is generated.

8. An autonomously or manually controlled transportation vehicle, wherein said transportation vehicle comprises a device for determining a lateral position of a transportation vehicle relative to the lane of a roadway, the device comprising:
   an image processing unit for ascertaining geometry information and characteristic information about roadway markings;
   a position determination unit for determining an approximate position of the transportation vehicle; and
   an evaluation unit for determining the lateral position of the transportation vehicle by comparing the ascertained geometry information and characteristic information about the roadway markings with roadway marking geometries at the approximate position determined for the transportation vehicle from a lane geometry map, and
   where, in response to a failure to determine the lateral position of the transportation vehicle by comparison of the ascertained geometry information and characteristic information about the roadway markings with roadway marking geometries, the evaluation unit generates an approximate lateral position, and
   wherein the lane geometry map contains lane center geometries and lane edge geometries having sub-lane accuracy with respect to one another; the lane geometry map being stored in a non-transitory computer readable storage medium, and comprising matrices containing a plurality of sets of WGS84 coordinates.

* * * * *